United States Patent
Baldwin

(10) Patent No.: US 9,635,129 B2
(45) Date of Patent: Apr. 25, 2017

(54) AUTOMATIC APPLICATION DISCOVERY, DOWNLOAD, INTEGRATION AND LAUNCH

(71) Applicant: AT&T Intellectual Property I, L.P., Atlanta, GA (US)

(72) Inventor: Christopher Baldwin, Algonquin, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/482,259

(22) Filed: Sep. 10, 2014

(65) Prior Publication Data
US 2016/0072913 A1 Mar. 10, 2016

(51) Int. Cl.
*G06F 9/44* (2006.01)
*H04L 29/08* (2006.01)
*G06F 9/445* (2006.01)

(52) U.S. Cl.
CPC ............ *H04L 67/306* (2013.01); *G06F 8/36* (2013.01); *G06F 8/60* (2013.01); *G06F 9/4451* (2013.01); *H04L 67/16* (2013.01); *H04L 67/34* (2013.01); *H04L 67/10* (2013.01)

(58) Field of Classification Search
CPC ... G06F 8/36; G06F 8/60; H04L 67/10; H04L 67/16
USPC ........................................................ 717/108
See application file for complete search history.

(56) References Cited

U.S. PATENT DOCUMENTS

| | | | |
|---|---|---|---|
| 7,627,313 B2 | 12/2009 | Aretz et al. | |
| 8,290,541 B2 | 10/2012 | Marsh et al. | |
| 8,291,408 B1 | 10/2012 | Czymontek | |
| 8,375,118 B2 | 2/2013 | Hao et al. | |
| 8,386,113 B2 | 2/2013 | Preston | |
| 8,471,691 B2 | 6/2013 | Zhang et al. | |
| 8,479,154 B1 | 7/2013 | Friedman | |
| 8,724,639 B2 | 5/2014 | Mahmoud | |
| 2007/0214036 A1* | 9/2007 | Aravamudan | G06Q 10/101 705/300 |

(Continued)

FOREIGN PATENT DOCUMENTS

WO WO2013016329 A1 7/2013

*Primary Examiner* — Li B Zhen
*Assistant Examiner* — Sen Chen
(74) *Attorney, Agent, or Firm* — Cantor Colburn LLP

(57) ABSTRACT

A mechanism is provided for integrated functionality across separate software applications to provide a response. First and second software applications are determined both of which are independently designed to perform actions to provide the response. The first software application has a first functionality software component and a first data source software component. The second software application has a second functionality software component and a second data source software component. According to a user profile, the OS selects between the first and second functionality software components a selected functionality software component, and selects between the first and second data source software components a selected data source software component from which to provide the data corresponding to the user request. The response is presented as the integration of the selected functionality and data source software components. The selected functionality and data source software components are not from the same software application.

20 Claims, 8 Drawing Sheets

(56) References Cited

U.S. PATENT DOCUMENTS

| | | | |
|---|---|---|---|
| 2009/0005072 A1 | 1/2009 | Forstall et al. | |
| 2009/0005981 A1 | 1/2009 | Forstall et al. | |
| 2009/0006994 A1 | 1/2009 | Forstall et al. | |
| 2013/0159993 A1* | 6/2013 | Misovski | G06F 8/61 717/177 |
| 2013/0282755 A1* | 10/2013 | Procopio | G06F 17/30126 707/770 |
| 2014/0033073 A1* | 1/2014 | Pegg | H04L 65/403 715/753 |
| 2014/0157422 A1* | 6/2014 | Livshits | G06F 21/6245 726/26 |
| 2014/0214757 A1* | 7/2014 | Kim | G06F 17/30029 707/608 |
| 2014/0237375 A1* | 8/2014 | Schachtel | G06F 3/0484 715/741 |
| 2014/0280535 A1* | 9/2014 | Owens | H04L 67/14 709/204 |
| 2014/0282608 A1* | 9/2014 | Biancalana | G06F 9/544 719/312 |
| 2014/0337528 A1* | 11/2014 | Barton | H04L 63/10 709/225 |
| 2015/0026003 A1* | 1/2015 | Baswa | G06Q 30/0633 705/26.8 |
| 2015/0161615 A1* | 6/2015 | Balasubramanian | G06Q 30/016 705/7.14 |

* cited by examiner

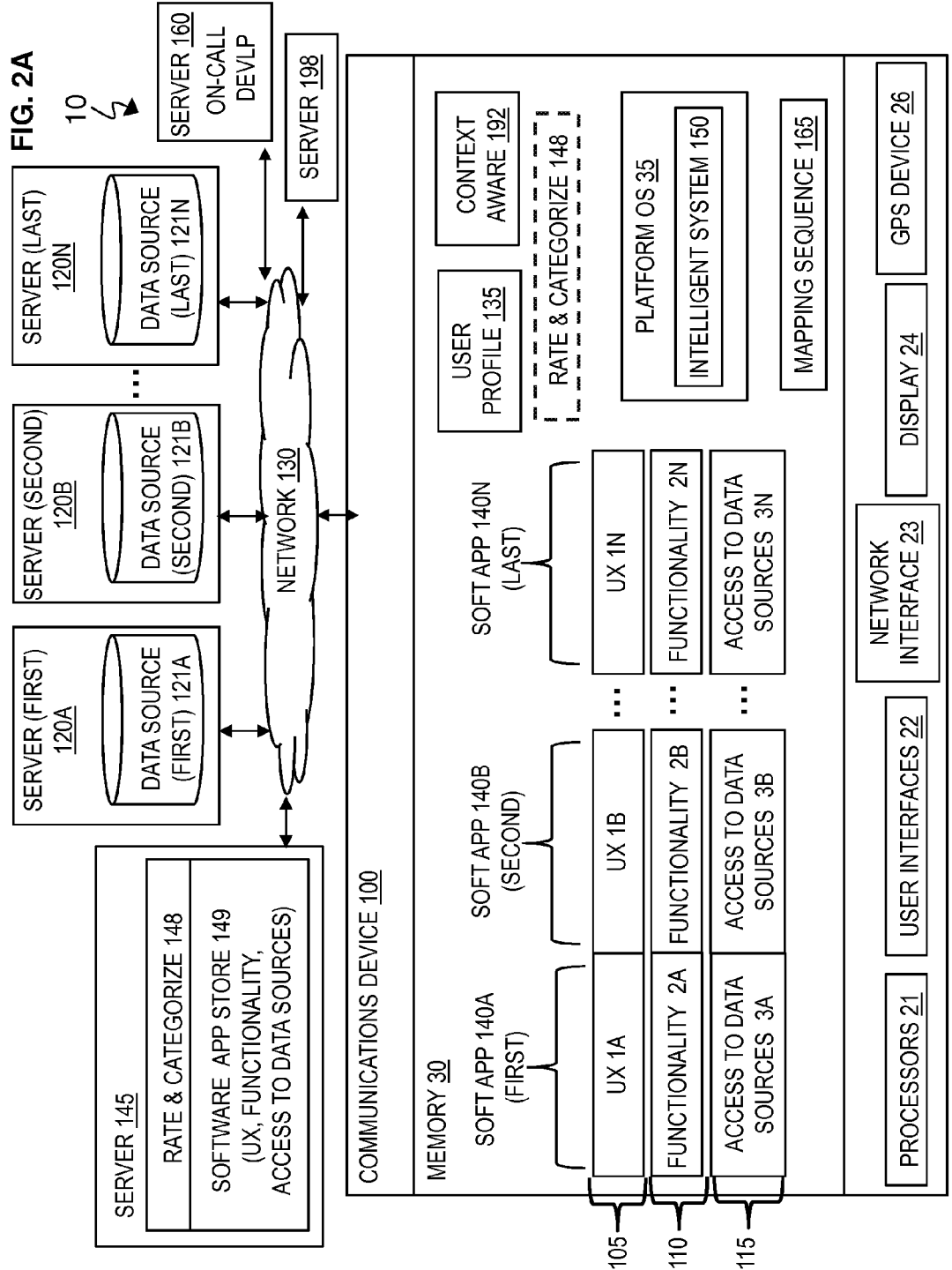

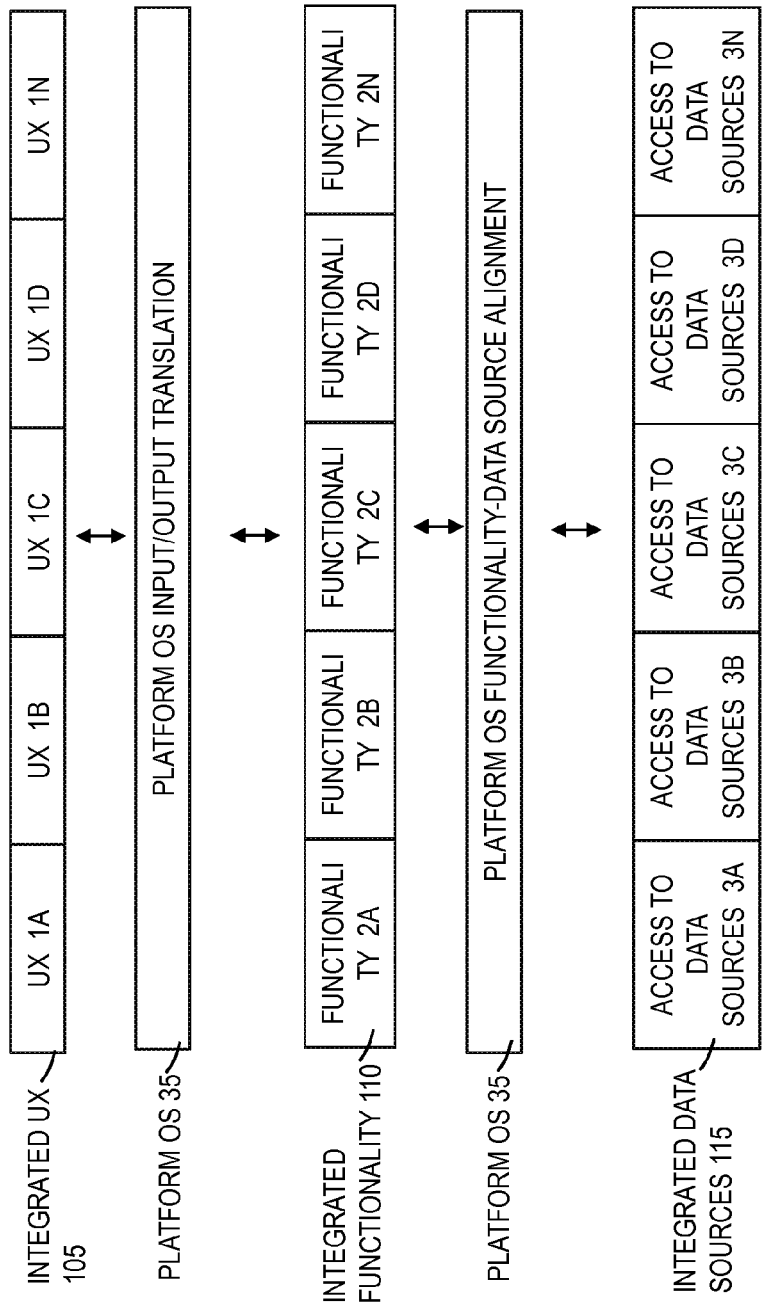
FIG. 2B  INTEGRATED APPLICATION RELATIONSHIP

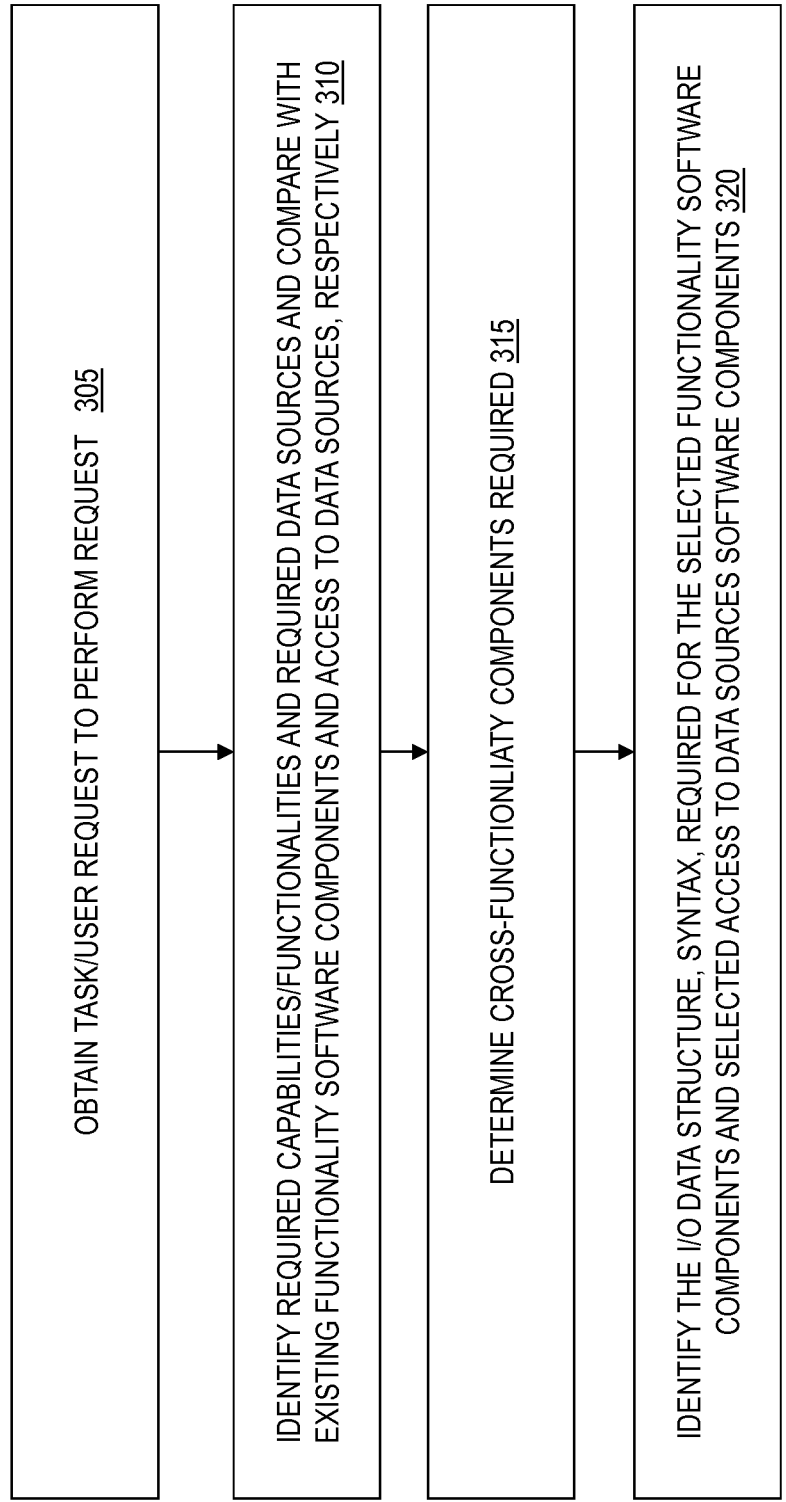

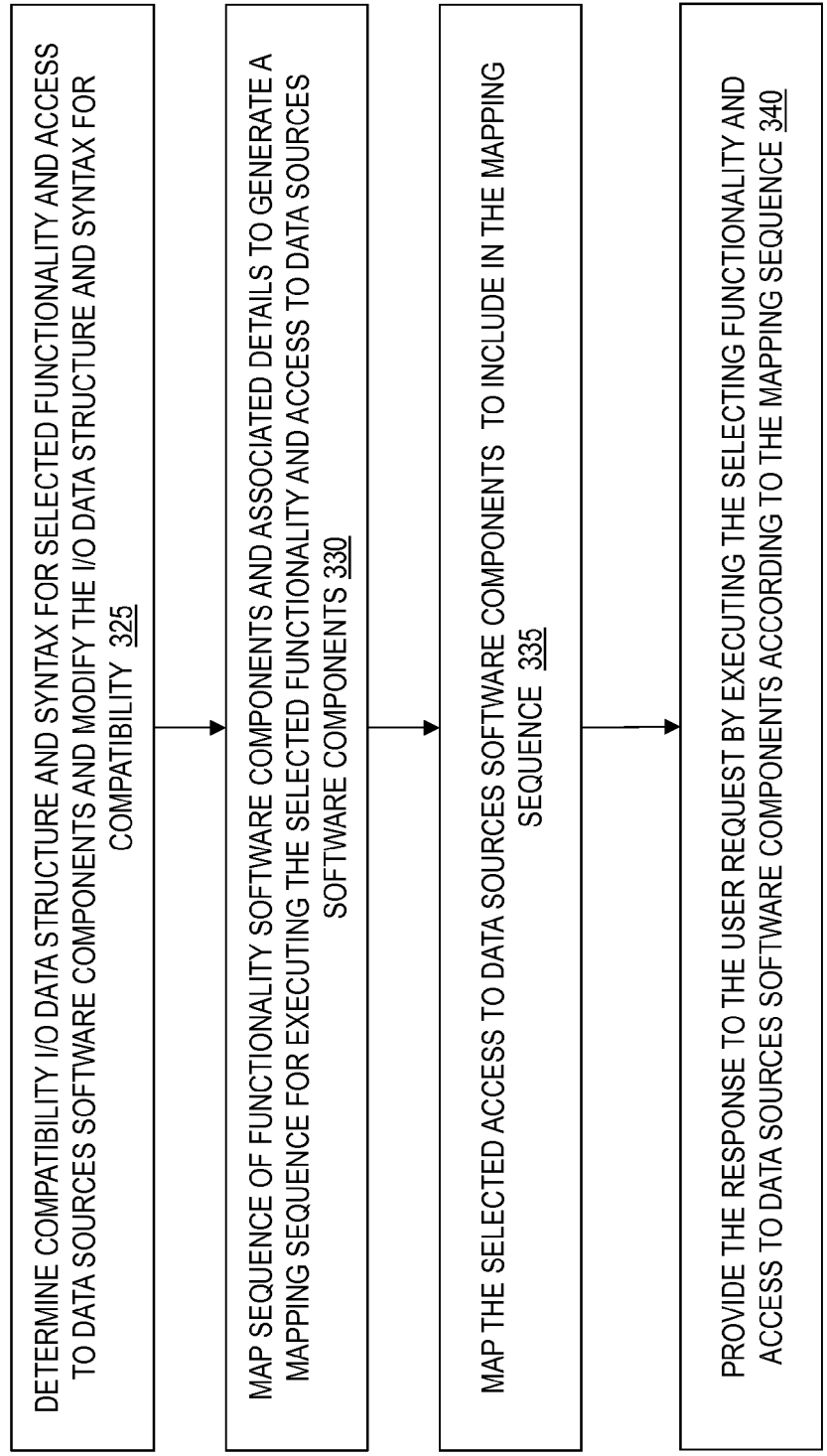

→ ACCORDING TO THE USER PROFILE, SELECT, BETWEEN THE FIRST DATA SOURCE SOFTWARE COMPONENT AND THE SECOND DATA SOURCE SOFTWARE COMPONENT, A SELECTED DATA SOURCE FROM WHICH TO PROVIDE THE DATA CORRESPONDING TO THE USER REQUEST 425

→ PRESENT THE RESPONSE TO THE USER REQUEST AS AN INTEGRATION OF THE SELECTED FUNCTIONALITY SOFTWARE COMPONENT AND THE SELECTED DATA SOURCE SOFTWARE COMPONENT 430

DO NOT SELECT BOTH THE SELECTED FUNCTIONALITY SOFTWARE COMPONENT AND THE SELECTED DATA SOURCE SOFTWARE COMPONENT FROM THE SAME SOFTWARE APPLICATION, THEREBY NOT EXCLUDING EITHER OF THE FIRST SOFTWARE APPLICATION AND THE SECOND SOFTWARE APPLICATION AND THUS ALLOWING INTEGRATION OF THE FIRST SOFTWARE APPLICATION AND THE SECOND SOFTWARE APPLICATION 435

AUTOMATIC APPLICATION DISCOVERY, DOWNLOAD, INTEGRATION AND LAUNCH

BACKGROUND

The present disclosure relates generally to software applications on a communications device, and more particularly, to automatic software application discovery, download, integration, and/or launch for execution on the communications device.

A mobile application (also referred to as "app") is a computer program designed to run on smartphones, tablet computers, and other mobile devices. Apps are usually available through application distribution platforms, which began appearing in 2008 and are typically operated by the owner of the mobile operating system, such as the Apple® App Store, Google® Play, Windows® Phone Store, and BlackBerry® App World. Some apps are free, while others must be bought. Usually, they are downloaded from the platform to a target device, such as an iPhone®, BlackBerry®, Android™ phone or Windows® Phone, but sometimes they can be downloaded to laptops or desktop computers. For apps with a price, generally a percentage, 20-30%, goes to the distribution provider (such as iTunes®), and the rest goes to the producer of the app. The same app can therefore cost the average smartphone user a different price depending on whether they use iPhone, Android, or BlackBerry devices.

The term "app" is a shortening of the term "application software". It has become very popular. It was noted that newer smartphones could be nicknamed "app phones" to distinguish them from earlier less-sophisticated smartphones.

Mobile apps were originally offered for general productivity and information retrieval, including email, calendar, contacts, and stock market and weather information. However, public demand and the availability of developer tools drove rapid expansion into other categories, such as mobile games, factory automation, GPS and location-based services, banking, order-tracking, ticket purchases and recently mobile medical apps. The explosion in number and variety of apps made discovery a challenge, which in turn led to the creation of a wide range of review, recommendation, and curation sources, including blogs, magazines, and dedicated online app-discovery services.

The popularity of mobile apps has continued to rise, as their usage has become increasingly prevalent across mobile phone users. Researchers found that usage of mobile apps strongly correlates with user context and depends on user's location and time of the day.

Developing apps for mobile devices requires considering the constraints and features of these devices. Mobile devices run on battery and have less powerful than personal computers and also have more features such as location detection and cameras. Developers also have to consider a lengthy array of screen sizes, hardware specifications and configurations because of intense competition in mobile software and changes within each of the platforms.

Mobile application development may require use of specialized integrated development environments. Mobile apps are first tested within the development environment using emulators and later subjected to field testing. Emulators provide an inexpensive way to test applications on mobile phones to which developers may not have physical access.

As part of the development process, mobile user interface (UI) design is also an essential in the creation of mobile apps. Mobile UI considers constraints & contexts, screen, input and mobility as outlines for design. The user is often the focus of interaction with their device, and the interface entails components of both hardware and software. User input allows for the users to manipulate a system, and device's output allows the system to indicate the effects of the users' manipulation. Mobile UI design constraints include limited attention and form factors, such as a mobile device's screen size for a user's hand(s). Mobile UI contexts signal cues from user activity, such as location and scheduling that can be shown from user interactions within a mobile application. Overall, mobile UI design's goal is primarily for an understandable, user-friendly interface. The UI of mobile apps should: consider users' limited attention, minimize keystrokes, and be task-oriented with a minimum set of functions.

BRIEF SUMMARY

Exemplary embodiments include a method for integrated functionality across separate software applications. The method includes receiving input of a user request from a user in order to provide a response, and determining, by a platform operating system executed by a processor, a first software application and a second software application both of which are independently designed to perform actions for the user request in order to provide the response. The platform operating system provides for integration of the first software application and the second software application. The first software application comprises a first functionality software component to perform the user request and comprises a first data source software component to provide data corresponding to the user request. The second software application comprises a second functionality software component to perform the user request and comprises a second data source software component to provide the data corresponding to the user request. According to a user profile, the platform operating system selects between the first functionality software component and the second functionality software component a selected functionality software component to perform the user request. According to the user profile, the platform operating system selects between the first data source software component and the second data source software component a selected data source software component from which to provide the data corresponding to the user request. Presenting a response to the user request as the integration of the selected functionality software component and the selected data source software component. The platform operating system does not select both the selected functionality software component and the selected data source software component from a same software application.

Other exemplary embodiments include an apparatus for integrated functionality across separate software applications. The apparatus includes a processor, and memory comprising computer-executable instructions that, when executed by the processor, cause the processor to perform operations. The operations includes receiving input of a user request from a user in order to provide a response and determining, by the processor, a first software application and a second software application both of which are independently designed to perform actions for the user request in order to provide the response. Integration of the first software application and the second software application is provided. The first software application comprises a first functionality software component to perform the user request and comprises a first data source software component to provide data corresponding to the user request. The second software application comprises a second functionality software component to perform the user request and comprises a second data source software component to provide the data corresponding to the user request. According to a user profile, between the first functionality software component and the second functionality software component a selected functionality software component is selected to perform the user request. According to the user profile, between the first data source software component and the second data source software component a selected data source software component is selected from which to provide the data corresponding to the user request. The response to the user request is presented as the integration of the selected functionality software component and the selected data source software component. The processor does not select both the selected functionality software component and the selected data source software component from a same software application.

Other exemplary embodiments include a computer program product, tangibly embodied on a computer readable medium, for integrated functionality across separate software applications. The computer program product including instructions that, when executed by a processor, cause the processor to perform operations. The operations includes receiving input of a user request from a user in order to provide a response and determining, by the processor, a first software application and a second software application both of which are independently designed to perform actions for the user request in order to provide the response. Integration of the first software application and the second software application is provided. The first software application comprises a first functionality software component to perform the user request and comprises a first data source software component to provide data corresponding to the user request. The second software application comprises a second functionality software component to perform the user request and comprises a second data source software component to provide the data corresponding to the user request. According to a user profile, between the first functionality software component and the second functionality software component a selected functionality software component is selected to perform the user request. According to the user profile, between the first data source software component and the second data source software component a selected data source software component is selected from which to provide the data corresponding to the user request. The response to the user request is presented as the integration of the selected functionality software component and the selected data source software component. The processor does not select both the selected functionality software component and the selected data source software component from a same software application.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF EXEMPLARY EMBODIMENTS

Referring now to the drawings wherein like elements are numbered alike in the several FIGURES:

FIG. 2A illustrates a system for providing automatic application discovery, download, integration, and launch on a communications device according to an embodiment;

FIG. 2B illustrates the integrated application relationship of the software applications in the communication device according to an embodiment;

FIGS. 3A and 3B illustrate a process performed utilizing integrated functionality to accomplish a task (i.e., user request) requested by the user according to an embodiment;

FIGS. 4A and 4B illustrate a flow chart of a method executed by the communications device for integrated functionality across separate software applications according to an embodiment.

The detailed description explains the exemplary embodiments, together with advantages and features, by way of example with reference to the drawings.

DETAILED DESCRIPTION OF DRAWINGS

Figure 1:
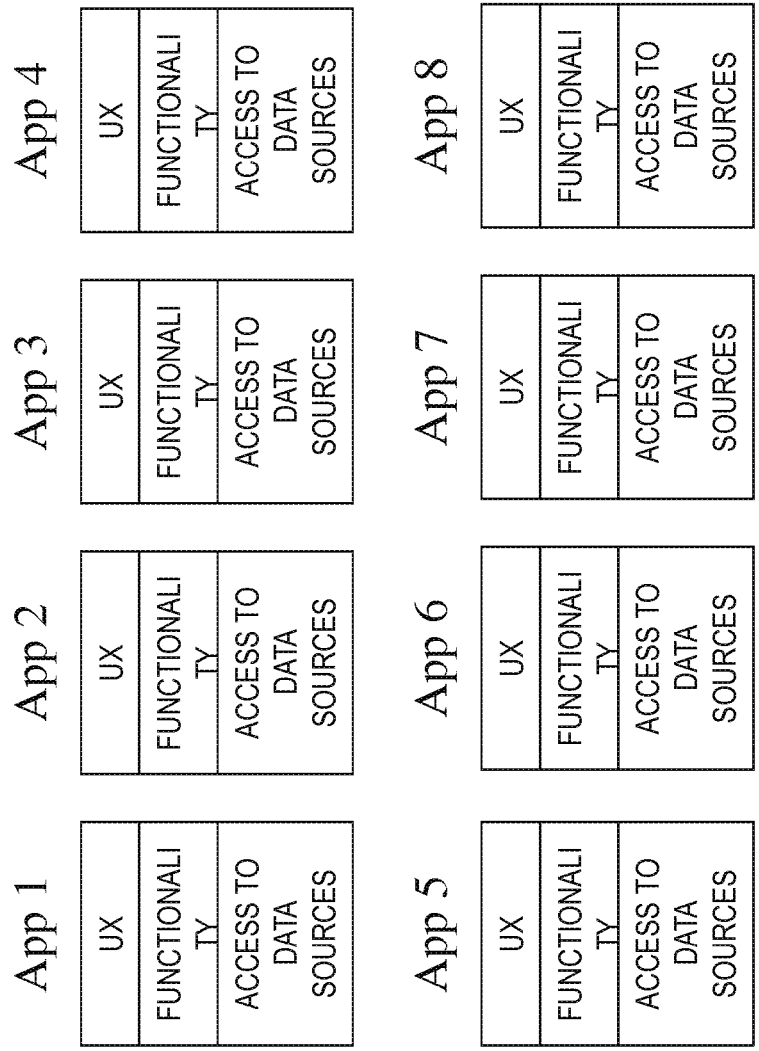
FIG. 1 illustrates a state-of-the-art application relationship for a traditional application.

One issue with new technology, especially technologies implemented in software applications (e.g. applications or apps), is the slow adoption of better algorithms, better user experience (UX), better access to data, etc. This is due primarily to the way that these better applications are discovered. This discovery process often uses word of mouth, written articles, and occasionally television. These communication methods, even accounting for viral situations, do not accomplish the task effectively for most potential users. As developing technology platforms, such as connected car devices and connected home devices, become more main stream an individual may find her ability to stay on top of the newest and/or best applications insufficient. This could lead to slower acceptance of new and/or better applications. FIG. 1 illustrates a state-of-the-art application relationship for a traditional application. The traditional application has a user experience, functionality, and access to data sources software all individually packaged in a single software application (e.g., mobile app). In the traditional application relationship, each of the various apps (e.g., App 1 through App 8) are designed to be separate from one another and designed not to communicate with one another at the user experience, functionality, and access to data sources software component level, when the apps are designed to fulfill the same purpose (e.g., such as a map application). That is, App 1 cannot share it functionality component with App 2, and App 2 cannot share its access to data sources component with App 3. Similarly, App 3 cannot share its user experience (UX) component with Apps 1 and 2. It is assumed that each of Apps 1 through 8 is individually developed by separate companies to complete the same desired task requested by a user, but the Apps 1 through 8 cannot access each other's software components (i.e., cannot access each other's user experience, functionality, and access to data sources software components).

The intersection of a growing focus on data-centric decision making, ubiquitous connectivity, and intelligent systems/devices presents an opportunity to change the paradigm for software implemented technology. The foreseeable evolution from traditional input methods (e.g. typing, tapping, sliding, etc.) as well as touchscreen based all in one mobile devices towards ubiquitous computing, wearable devices, and new input methods (e.g. gesture, speech, etc.)

lends further support to a paradigm shift in software implemented technology. This evolution reduces the importance (or eliminates entirely) the graphical user interface which is such an important aspect of modern smartphone applications. Incorporating speech and gesture input methods into developing technology spaces like the connected car devices and the connected home devices may accelerate the evolution in other areas. According to embodiments, this shifting focus from user experience (UX) to functionality and performance across multiple technologies may be the first step toward breaking the current application model into its distinct components, which are user experience (UX), functionality, and data sources (access/databases). This separation of user experience (UX), functionality, and data sources may enable each component to be developed, sold, and utilized independent of the others, according to embodiments. This enables greater integration of functions as well as increased access to data sources. This also opens up development opportunities for outsiders to improve the algorithms/functionality usually limited to employees of the company that developed the application. This creates new potential revenue and cost models for each component of an application as well as accelerates the optimization of application functionality. By separating the primary components of traditional applications (into user experience (UX), functionality, and data sources) in embodiments, application developers can focus on what they do best rather than providing a complete application with great functionality and a mediocre user experience.

FIG. 2A illustrates a system 10 for providing automatic application discovery, download, integration, and launch on a communications device 100 according to an embodiment.

The communications device 100 may be a phone (such as a smartphone), a connected car device (e.g., installed in a vehicle), a connected home device (e.g., a home appliance, set top box, media player, television), a tablet, a laptop computer, a desktop computer, a gaming device, etc. The communications device 100 includes processors 21 for executing instructions, user interfaces 22 (such as keyboards, touch screens, mouse, microphone, camera, etc.) for interfacing with the communications device 100, network interfaces 23 for connecting to wired connections and wireless connections (with a transceiver) such as network 130, and display 24 for displaying information to the user.

The communications device 100 includes memory 30. The memory 30 may include a platform operating system 35 and software applications. The memory 30 includes integrated user experience software components 105, which are each configured to work together because of their own standardized design and/or because of the platform operating system 35 being configured to translate between the different formats of the user experience components 1A through 1N. The memory 30 includes integrated functionality software components 110, which are each configured to work together because of their own standardized design and/or because of the platform operating system 35 being configured to translate between the different formats of the functionality software components 2A through 2N. Note that the translation between different formats may be by an intermediate functionality (e.g., in place of the platform operating system 35 performing translation), which is a software component in (downloaded from) a software application store (such as the software application store 149). When a new software component is downloaded from the software application store 149, the store 149 may have the executable process for translating between formats.

The memory 30 includes access to data sources software components 115, which are each configured to work together because of their own standardized design and/or because of the platform operating system 35 being configured to translate between the different formats of the access to data sources software components 3A through 3N.

More regarding the integrated relationship of the integrated user experience software components 105, the integrated functionality software components 110, and the integrated access to data sources software components 115 is discussed below. Unlike the traditional application relationship in FIG. 1, FIG. 2B illustrates the integrated application relationship of the software applications in the communication device 100 according to an embodiment. As can be seen in FIG. 2B, any one or more of the user experience components 1A through 1N can be selected by the platform operating system 35, when there is a user request to perform a task input by the user via the user interface 22. Next, any one or more of the functionality software components 2A through 2N can be selected by the platform operating system 35 to process the task and perform processes needed to provide a response to the user (e.g., two different functionality software components 2A and 2B may be selected to simultaneously and/or individually execute processes according to the task requested). Any one or more of the access to data sources 3A through 3N may be selected by the platform operating system 35 to retrieve data necessary to process and perform the requested task, and the selected functionality software components 2A and/or 2B utilize and process the retrieved data to provide the response to the task back to the user. The first through last data sources 121A through 121N are memory storage devices (each having data databases) in respective servers 120A through 120N, and the servers 120A through 120N may connect to the communications device 100 though the network 130. The user experience software component includes the protocols and expected input data structures, as well as the capable input methods, user experience structures, etc. The user experience software component may also include data gathering capabilities as well as user preference/customization capabilities. The functionality software component includes any analysis and modification of user inputs, data, and/or data obtained from other sources including those of the access to data sources software component. The functionality software component may also include expected input data structures as well as output data structures. The access to data sources software component includes the protocols, structures, and access privileges to obtain data from a remote location or collection of remote locations (including sensors/sensor networks) such as data sources 121.

User preferences for each task (user requests) are pre-stored in a user profile 135, in order for the platform operating system 35 to determine (and select) which user experience software component (1A-1N) of the integrated user experience software components 105 to utilize, determine (and select) which functionality software component (2A-2N) of the integrated functionality software components 110 to utilize, and determine (and select) which access to data sources software component (3A-3N) of the integrated access to source software components 115.

In one case, there may be various different software applications 140A through 140N, where each software application 140A through 140N is individually/independently developed (by different software development companies) and designed to completely perform the same task (user request) without the assistance from another one of the software applications 140A through 140N. For example, if the task is related to mapping such as, e.g., to find a destination and navigate to the destination from the current location, then each of the software applications 140A through 140N is designed to independently perform this task (by providing a response). Although mapping (and navigating) is the example task given, the concept is that the different software applications 140A through 140N may be related to the same particular task such as playing music, playing movies/shows, social media, news, etc., and that the platform operating system 35 is configured to integrate aspects of the different software applications 140A though 140N to fulfill user preferences in user profile 135. Although the platform operating system 35 may be able to integrate the respective user experience software components 105, the functionality software components 110, and the access to data sources software components 115 in order to accomplish a task, the different software applications 140A through 140N may each have their own user experience software component, functionality software component, and access to data sources software component. For example, the software application 140A may have and be designed with its own user experience software component 1A, functionality software component 2A, and access to data sources software component 3A, which were each designed to work together to perform accomplish the same task (e.g., mapping and navigation). Similarly, other software applications 140B through 140N each have their own user experience software component, functionality software component, and access to data sources software component and are each designed to work together to perform/accomplish the same task (e.g., mapping and navigation). For example, the software application 140B may have and be designed with its own user experience software component 1B, functionality software component 2B, and access to data sources software component 3B, which were each designed to work together to perform accomplish the same task (e.g., mapping/navigation); likewise, the software application 140C may have and be designed with its own user experience software component 1C, functionality software component 2C, and access to data sources software component 3C, which were each designed to work together to perform accomplish the same task (e.g., mapping/navigation). The same may apply to the other software applications 140. When a task (user request) is requested by the user, the platform operating system 35 is configured to utilize user preferences in the user profile 135 to select, e.g., two or more desired software applications (having the required functionalities and capabilities to complete the task, such as mapping and navigating capabilities) of the software applications 140A through 140N to accomplish this task, but the user preferences in the user profile 135 can specify (to the platform operating system 35) which user experience software component, which functionality software component, and which access to data sources software component to utilize from two (or more) different software applications (e.g., software applications 140A and 140B). Accordingly, the platform operating system 35 is configured to utilize the selected/specified user experience software component, functionality software component, and access to data sources software component designated by the user profile 135. In one case, note that any one or more of the user experience software components 1A through 1N, the functionality software components 2A through 2N, and the access to data sources software components 3A through 3N may be a stand-alone software component. For example, although software applications 140A through 140N are shown as having a user experience software component, a functionality software component, and an access to data sources software component, any of the components may be separate and not part of software applications 140A through 140N.

FIGS. 3A and 3B illustrate a process 300 performed by the communications device 100 utilizing integrated functionality to accomplish a task (i.e., user request) requested by the user according to an embodiment. Task and user request may be utilized interchangeably.

At block 305, the platform operating system 35 obtains a task (user request) to do something (e.g., find/map a destination and navigate to the destination from the current location) via user interface 22, and the platform operating system 35 may receive the user's input of the task through user experience software (UX) component 1A. Via the user interface 22, the task may be received from the user by a voice command, by input on a keyboard, by input on a touch screen, by input of a gesture obtained by a camera, etc. Assume that the user spoke a voice command into the microphone of the user interface 22 and asked to find a destination and then navigate to the destination from the user's current location (found using a global positioning system (GPS) device 26). As set in user preferences in the user profile 135, the platform operating system 35 may select and utilize user experience software component UX 1A (of, e.g., software application 140A) because the UX 1A can receive input of voice commands for mapping and navigation and because the user profile 135 identifies that the user prefers the output/display of the user experience software component 1A over the other user experience software components UX 1B through 1N (for the requested task of mapping and navigating).

At block 310, the platform operating system 35 is configured to identify the capabilities/functionalities required and the access to data sources required to accomplish the requested task, and then platform operating system 35 is configured to select the individual functionalities software components from the integrated functionality software components 110 according to the user profile 135 and to select the required individual data sources from the integrated access to data sources software components 115. For example, the platform operating system 35 compares the needed capabilities/functionalities (which are mapping and navigation capabilities in this example, but could be music, television shows, movies, etc. in other cases) to the available and existing capabilities/functionalities (e.g., in functionality software components of software applications 140) in order to select the individual functionalities software components from the integrated functionality software components 110. Also, the platform operating system 35 compares the needed access to data sources (which are for mapping and navigation data sources in this example, but could be music, television shows, movies, etc. in other cases) in order to select the required individual data sources from the integrated access to data sources software components 115. Note that the integrated access to data sources software components 115 (stored in memory 30) are not the data sources (databases) themselves, but contain the required permission and authentication (including user names and passwords, account numbers, access codes, etc.) to access the respective data sources 121A through 121N on respective servers 120A through 120N.

In one case, to meet the capabilities/functionalities requirement, the platform operating system 35 selects functionality software component 2A and functionality software component 2B from the integrated functionality software components 110 (according to user preferences in the user profile 135 to accomplish the task requested by the user), which are both previously and independently designed to provide the response for the task input by the user. Note that there were other functionality software components that could perform the task but the platform operating system 35 did not select them because the user preferences in the user profile 135 preferred functionality software components 2A and 2B. In one implementation, the functionality software component 2A may perform a first part of the processing required for the task (user request). The platform operating system 35 takes the output of the functionality software component 2A and provides the output as input to the functionality software component 2B, in which the functionality software component 2B performs the second part of the processing required for the task. To meet the data sources requirement (e.g., for mapping and navigating from a current location to a destination location), the platform operating system 35 selects access to data sources software component 3B from the integrated access to data sources software components 115 (according to user preferences in the user profile 135 to accomplish the task requested by the user), instead of selecting the access to data source software component 3A which could have been utilized (but is not preferred in the user profile 135). Note that both access to data source software components 3A and 3B are previously and independently designed to provide data for the response for the task input by the user.

The access to data source software component is designed to communicate and make connection, via network 130, to a desired data source, e.g., a particular first through last data sources 121 on one of first through last servers 120. By checking the user preferences in the user profile 35, the platform operating system 35 is designed to recognize/identify and select the access to data source software component 3B (instead of the candidate access to data source software 3A) to fulfill the task requested by the user.

At block 315, the platform operating system 35 is configured to determine cross-functionality components required between two or more of the integrated functionality software components 110. Cross-functionality requires two or more functionality software components (e.g., functionality software components 2A and 2B) in the integrated functionality software components 110 to work together in order to provide the response to the user. Cross-functionality allows one functionality software component 2A to perform part of the processing, and hand its output (via platform operating system 35) over to another functionality software component 2B to perform the other part of the processing. Output from the functionality software component 2B can be returned to the software component 2A as needed. In one case, being designed by two different/competing software development companies to accomplish the same task (e.g., mapping and navigation), the software application 140A (having software components 1A, 2A, 3A) may not be compatible with the software application 140B (having software components 1B, 2B, 3B). To account for incompatibility, the platform operating system 35 is configured to identify the input/output (I/O) data structure and syntax (i.e., format may be C, C++, Unix based, Java, etc.) of the selected functionality software components 2A and 2B (more than two functionality software components may be selected in one case) for software applications 140A and 140B, respectively, at block 320. At block 325, the platform operating system 35 is configured to determine the input and output compatibility of the selected functionality software components 2A and 2B (along with selected access to data sources software component 3B), and the platform operating system 35 is configured to modify the respective input/output data structure, syntax, etc., so that the data is compatible when transferred (back and forth) between the selected functionality software components 2A and 2B of software applications 140A and 140B, respectively (along with selected access to data sources software component 3B). Note that the platform operating system 35 may parse the code of each of the integrated functionality software components 110 (along with integrated user experience software components 105 and integrated access to data sources software components 115) in advance to determine their respective input/output (I/O) data structure and syntax as understood by one skilled in the art.

In one implementation, the two integrated functionality software components 110 (e.g., selected functionality software components 2A and 2B) may utilize a standardized (i.e., the same) input/output (I/O) data structure, syntax, etc., to perform their respective parts of the processing, and no compatibility processing by the platform operating system 35 is required. In this case, the platform operating system 35 is configured to move input data and output data back and forth between the selected functionality software components 2A and 2B (of software applications 140A and 140B, respectively, as needed to accomplish the task, and then present the response to the task using the preferred output display for the selected user experience (which is, e.g., the user experience software component 1A).

Additionally, there may be a case in which the two integrated functionality software components 110 (e.g., selected functionality software components 2A and 2B) may not utilize a standardized input/output (I/O) data structure, syntax, etc., to perform their respective parts of the processing, and therefore, compatibility processing by the platform operating system 35 is required. In this case, the platform operating system 35 is configured change the input/output (I/O) data structure, syntax, etc., into the input/output (I/O) data structure, syntax necessary to move input data and output data back and forth between the selected functionality software components 2A and 2B (of software applications 140A and 140B, respectively), as needed to accomplish the task, and then to present the response to the task using the preferred output display for the selected user experience (which is, e.g., the user experience 1A). In one case, to translate/convert between two formats (e.g., the input/output (I/O) data structure, syntax, etc.), the platform operating system 35 may incorporate machine learn to recognize format, structures, etc., and convert as necessary. In another case, with regard to translation/converting between two formats (e.g., the input/output (I/O) data structure, syntax, etc.), an intermediate functionality component may be utilized. In this case, the platform operating system 35 would not need to convert anything. In another case, the software application store 149 or other remote system might provide the platform operating system 35 with the rules required to convert between two formats, structures, etc.

To accomplish the requested task, the platform operating system 35 is configured to map the sequence (and store in mapping sequence 165) for which of the selected functionality software components 110 is to perform its functionality job (process) first, second, third, etc., and/or simultaneously, along with the associated details (which includes the I/O data structure, syntax (e.g., computer language)) for each of the selected functionality software components 110 at block 330. In one case, the platform operating system 35 can do the full mapping. In another case, the mapping can be changed according to the context of what software components are being utilized. In other words, the mapping is not fixed and may change according to contextual awareness information as monitored/provided by contextual awareness software 192. The contextual awareness software 192 may work alone and/or in conjunction with the platform operating system 35 to perform mapping. The contextual awareness software 192 may receive various contextual information related to the user, such as emotional state (e.g., from a wearable device of the user), calendar information (including schedules), GPS data (e.g., from the GPS device 26) to determine if the user is moving (e.g., driving), messaging information, telephone calling information, etc. The platform operating system 35 is configured to utilize contextual information from both the user profile 135 and the contextual awareness software 192 when performing mapping. Suppose that the platform operating system 35 usually maps to a particular access to data sources software component for Google® (in order to access a Google® maps data source), but the contextual awareness software 192 provides information that the user is in a large building such as the mall. In this case, the platform operating software 35 is configured to map to an access to data sources software component for an internal building (e.g., malls of America) that corresponds to a data source/database for the internal layout and floor plans of buildings (such as the mall).

Additionally, the platform operating system 35 is configured to identify and map (stored the necessary conversions for the I/O data structure and syntax) the selected access to data sources software component 3B in the integrated access to data sources software components 115 that are associated with each selected functionality software component 2A and 2B, at block 335. The platform operating system 35 is configured to map when (e.g., multiple times) input is to be provided to the selected access to data source software component 3B such that data (e.g., mapping and navigation data) can be requested and retrieved from the data source 121B of server 120B. As noted earlier, each access to data sources software component 3A though 3N is designed to access its own data source 121A through 121N, respectively. For example, access to data source software component 3J would access data source 121J in server 120J. Using the I/O data structure and the syntax previously determined (along with any necessary compatibility modifications) and stored in the mapping sequence 165, the platform operating system 35 is configured to access the selected access to data source software component 3A when needed.

At block 340, the platform operating system 35 is configured to provide the response to the task (using the selected user experience (e.g., UX 1A)) by executing (according to the mapping sequence 165) the selected functionality software components 2A and 2B and the selected access to data sources software component 3B in order to develop the mapping and navigating response for the user. The response to the requested task/user request may be displayed on the display 24 and heard through speakers of the user interfaces 22 using the selected user experience software component 1A (of software application 140A). The selected user experience software component 1A has the desired layout and features for mapping and navigating as preferred by the user in the user profile 135. However, the platform operating system 35 and/or the user may recognize (and store in user profile 135) that the access to data sources software component 3B connects to the most up-to-date/comprehensive database, e.g., data source 121B, and therefore, the platform operating system 35 is configured to perform integration in order to access the data source 121B through data sources software component 3B (of software application 140B). The user may give the platform operating system 35 permission to parse the rating and categorization database 148 to find (and download) the best user experience software components, functionality software components, access to database sources software components in any particular software application (in the software application store). This allows the platform operating system 35 the ability to integrate improved functionality and data sources (in the user profile 135) when performing the user request for the user.

Various examples are provided that take advantage of the features discussed above. As can be seen herein, this disclosure separates the three primary components of traditional applications and enables the integration of functionality and access to data sources within the platform/communications device 100 (e.g. smartphone/mobile device, connected car device, connected home device, etc.). Software applications 140A through 140N on these platforms (such as, e.g., communications device 100) are integrated rather than functioning as independent units which may occasionally communicate with one another. Integration is with respect to how different software components are allowed to work together as a whole according to embodiments. Unlike different smartphone apps that perform the same function/task, the platform (communications device 100 which may be, e.g., a smartphone/mobile device, connected car device, connected home device) may have a user experience UX (e.g., user experience software component 1A) that appears the same or similar regardless of the functionality being utilized (e.g., functionally software component 2A, 2B, 2C) and/or which developer contributed/developed it. User inputs are converted by the platform operating system 35 into the corresponding input for different software applications (e.g., converted to be utilized by functionality software components 2A and 2B when the input is not compatible in its original form) if existing application functionality is replaced by a better one that may have different inputs (i.e., different I/O data structure and syntax). A gesture to turn something on (i.e., initialize) utilizing process A in functionality software component 2A (of software application 140A) might involve waving an open hand in front of the camera of user interface 22. When the process A in functionality software component 2A (of software application 140A) is replaced by better a better process B in functionality software component 2B (of software application 140B), the input for process B in functionality software component 2B to turn something on might be a clap (received via the microphone of the user interface 22). The user (of communications device 100) can still wave an open hand (to turn something on, i.e., initiate the function) (as set in the user preferences of the user profile 135) even if process B in functionality software component 2B is utilized because the platform operating system 35 that downloaded (from server 145) and installed the process B of functionality software component 2B (in communication device 100) knows the old input (wave open hand) and the new input (clap) and can convert between the two. The platform operating system 35 is designed to recognize the input of the hand wave (e.g., via functionality software component 2A) and translate the hand wave into the necessary input for the hand clap, so that the input (I/O data structure, syntax) is now compatible with process B in functionality software component 2B.

The user experience software component (UX) becomes another level of development just like functionality of the functionality software component. Different user experience capabilities created by different developers can be integrated into a single user experience (e.g., integrated user experience software components 105) that is used for most or all interaction between the user and the platform (communications device 100). These different UX capabilities can include speech input, gesture input, speech and gesture recognition, context capturing and analysis, display, intelligent digital assistants, etc. As shown in FIG. 2B, the platform operating system 35 serves as an interpreter between the integrated user experience (UX) software components 105 and the integrated functionality software components 110 ensuring that inputs are correctly converted (if necessary) into the appropriate format for use in the integrated functionality software component 110. Note that any one or more of the user experience software components 1A through 1N, the functionality software components 2A through 2N, and the access to data sources software components 3A through 3N may include application programming interfaces (APIs).

Now turning to the integrated access to data sources software component 115, this data source software component 115 can be aggregated and organized as well. Access to different data sources 3A though 3N may be catalogued and associated with different functionality software components 2A through 2N by the platform operating system 35. Again, in this case, the platform operating system 35 is responsible for ensuring proper association between the functionality (of the functionality software components 2A through 2N) and the access to data sources (of the access to data sources software components 3A through 3N). This ensures that a user's interest in news articles does not result in streaming music.

This disclosure further provides enabling objective rating and categorization of application functionality, I/O, performance, etc., (stored in rating and categorization database 148) in the software application store server 145. This enables an intelligent system 150 in the platform operating system 35 to select (on the server 145) the most appropriate functionality software component, purchase the functionality software component if required and permitted (in the user profile 135), download the purchased functionality software component, and integrate purchased functionality software component into the integrated functionality software components 110 without the user's knowledge (e.g., without having to ask the user for permission). This objective analysis and categorization in database 148 (which may optionally be stored (in whole or part) in communications device 100) enables rapid adoption of improved methods by mechanizing part or all of the discovery process. The intelligent system 150 in the platform operating system 35 may identify needs of a user and/or connected system and search for the best software application that matches the needs/requirements. These requirements could include the desired functionality, compatibility with existing and planned/future integrated applications, performance requirements, size, cost, relative improvement in these categories (cost benefit analysis), etc. The analysis and categorization of software applications (in database 148) further enables the intelligent system 150 in the platform operating system 35 to recommend new software applications (stored on server 145) based on what software applications 140A through 140N that have currently been downloaded and integrated and based on what new software applications may better match the intelligent system's requirements (in platform operating system 35) than ones currently being used.

According to the discovery and download process above, using this solution the platform operating system 35 of the communications device 100 can use its pre-stored knowledge of its user/user's (e.g., stored in the user profile 135) to determine what functionality, user interface characteristics (in the user experience UX), and data sources that are useful/beneficial to the user. This intelligent system 150 of the platform operating system 35 then identifies the possible new software application (e.g., a new software application having new a new user experience software component, functionality software component, new access to data sources software component) that fit the user's preferences in the user profile 135 and possibly other requirements. The intelligent system 35 of the platform operating system 35 can compare all candidate software applications (including their respective user experience, functionality, and access to data sources components) across one or more metrics (stored in analysis, rate, and categorization database 148) and select the one that best fits the identified needs and requirements. The intelligent system 150 in the platform operating system 35 can purchase the software application based on the best metrics) if required (when permitted by the user according to a user setting in the user profile 135 and/or could request authorization from the user), download the software application, and integrate the user experience, functionality, and access to data sources software components in the purchased software application with any other software components in the same component level (user experience UX, functionality, access to data sources software components). Note that although user experience software components, functionality software components, and access to data sources software components are the three types mentioned in this disclosure, it is contemplated that other breakdowns/classifications are possible. When new user experience, functionality, and access to data sources software components (or updates) are introduced into the application component market (represented by the software application store 149), the new user experience, functionality, and access to data sources software components are analyzed, measured, and catalogued (in the database 148) to enable simple searching and comparison by the intelligent system 150 of the platform operating system 35. A compatibility comparison may also be performed by the platform operating system 35 and the results documented (in the user profile 135) to ensure proper functioning when integrated with other components (i.e., the integrated user experience software components 105, functionality software components 110, access to data source software components 115 in the communication device 100).

When the intelligent system 35 of the platform operating system 35 compares all candidate user experience components, functionality software components, and access to data sources software components across the metrics may include objective metrics and/or subject metrics. The (objective) metrics of each of the user experience components, functionality software components, and access to data sources software components may include (and be ranked according to) the following:

1) Required computing resources: such as required processing/clock cycles, memory requirements, etc. A software component requiring the fewest computing resources is ranked higher than a software component requiring more computing resources, when both can complete the task.

2) How many intermediate components are required (and how large are they, what computing resources are required, etc.,) for the new software component relative to existing (old) software component (if any) already on the communications device 100 for completing the task. For example, the new software component may require more intermediate components than the old software component, and the platform OS 35 may not download the new software component (or vice versa).

3) Number and quality of integrated uses for the new software component relative to existing (old) software component. The new software component (to be downloaded from store 149) may connect to more software components to the existing (old) software component already on the communications device 100. As such, the platform operating system 35 is configured to download the new software component.

4) Data source quality (more recently updated), data source scale (larger size), and data source scope (larger selection) of and/or related to the new software component is greater in amount than the exiting (old) software component. The platform operating system 35 is configured to download the new software component.

5) User experience metrics for successful input recognition and false positive input recognition of the new software application are ranked higher than the existing (old) software component. In this case, the platform operating system 35 is configured to download the new software component for use.

The goal of the platform operating system 35 is to use (and download) the best component for the situation/context. Accordingly, there are subject metrics utilized by the platform operating system 35 in this decision. Part of this is specific to the user of the communications device 100, such as which existing (old) components are being used, which components might be used with the new component, and how frequently will various combinations be used and in what situations. There are two levels being viewed, which are the individual component level and the user specific integrated level. The platform operating system 35 is configured to recognize that the software components the user likes to use (based on user profile 135) are not directly compatible with the highest ranked new software component and lots of translation/converting of formatting is required. In this case, the platform operating system 35 is configured to pick and download a lesser ranked new software component from the store 149 that is completely (and/or more) compatible with the exiting (old) software components regularly used by the user.

Further, the intelligent system 150 of the platform operating system 35 may generate a request to have functionality created on demand and send the request to on-call developers at server 160. For example, the intelligent system 150 of the platform operating system 35 is configured to identify a need for some functionality which the platform operating system 35 communicates (the request) to the application component market 149 on server 145; the intelligent system 150 may search and/or cause the server 145 to search the application component market 149 (and/or database 148) in an attempt to meet the request. If the request is met by the application component market 149 in server 145, the intelligent system 150 can purchase, download, and integrate the purchased functionality software component into the communications device 100. Alternatively (e.g., if the request cannot be met by server 145) and/or additionally, this request/need is sent to the on-call developers on the on-call developers server 160 to rapidly create this functionality software component. Upon completion of the request (for the functionality software component) by the on-call software developers operating the server 160, the server 160 notifies the intelligent system 150 of the platform operating system 35 that the requested functionality software component is completed; the intelligent system 150 of the platform operating system 35 is configured to purchase, download (from the server 160 to communications device 100), and integrate the purchased functionality software component into the communications device 100.

Figure 4A:
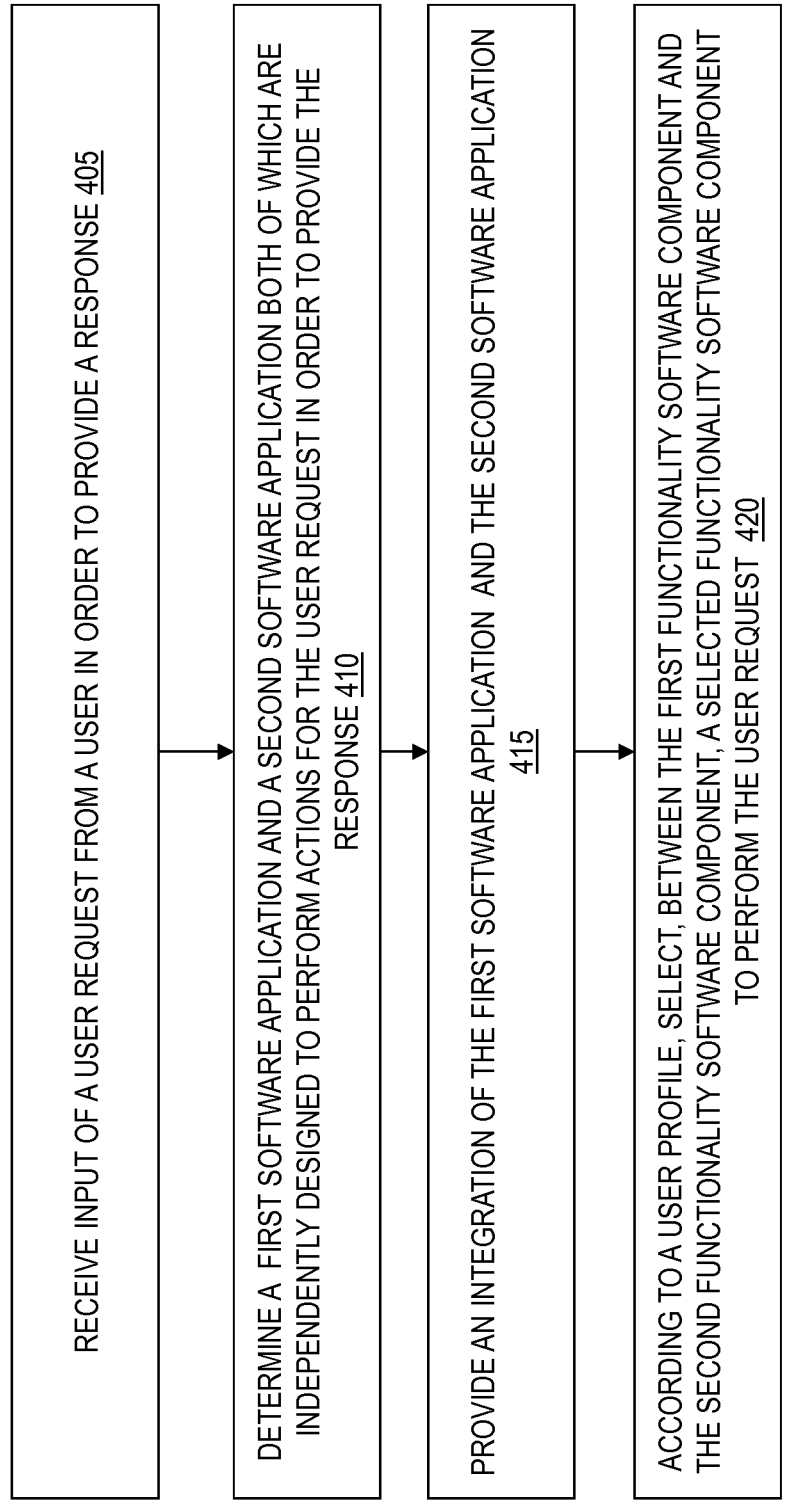

Now turning to FIGS. 4A and 4B, a flow chart 400 of a method executed by the communications device 100 for integrated functionality across separate software applications is provided according to an embodiment. As discussed herein, the platform operating system 35 (including the intelligent system 150) may comprise instructions that are executed by the processors 21 of the communications device 100.

At block 405, the communications device 100 (e.g., the platform operating system 35 having instructions executed by one or more processors 21) receives input of a user request from a user in order to provide a response. As an example, the user request may be for mapping and navigating to a destination from a current location.

At block 410, the communications device 100 determines a first software application 140A and a second software application 140B (and any other needed software applications 140) both/each of which are independently designed (e.g., by different software developers) to perform actions (which may be the same type of actions) for the user request in order to provide the desired response back to the user. Although two example software applications are determined to have qualities/ability to provide the response to the user request (e.g., for mapping and navigating to a destination from a current location), it is understood that the communications device 100 (e.g., the platform operating system 35 having instructions executed by one or more processors 21) may determine that multiple software applications 140 to have qualities/ability to provide the response to the user request.

At block 415, the communications device 100 (e.g., platform operating system 35) is designed to provide an integration of the first software application 140A and the second software application 140B. The first software application 140A comprises a first functionality software component 2A to perform the user request, comprises a first data source software component 3A to provide data corresponding to the user request (by accessing the first data source 121A in server 120A), and comprises a first user experience software component 1A designed to both receive the user request and present the response to the user request. The second software application 140B comprises a second functionality software component 2B to perform the user request, comprises a second data source software component 3B to provide the data corresponding to the user request (by accessing the second data source 121B in sever 120B), and comprises a second user experience software component 1B designed to both receive the user request and present the response to the user request.

At block 420, according to (user preferences pre-stored) the user profile 135, the communications device 100 selects, between the first functionality software component 2A and the second functionality software component 2B, a selected functionality software component to perform the user request. Although two example functionality software components are illustrated, it is contemplated that the selection may be among multiple functionality software components in the integrated functionality software components 110.

At block 425, according to (user preferences pre-stored) the user profile, the communications device 100 selects, between the first data source software component 3A (designed to request and retrieve data from data source 121A) and the second data source software component 3B (designed to request and retrieve data from data source 121B), a selected data source from which to provide the data corresponding to the user request.

At block 430, the communications device 100 presents the response to the user request as an integration of the selected functionality software component (which may be functionality software component 2A, 2B, and/or both in this example) and the selected data source software component (which may be data source software component 3A, 3B, and/or both, although data from a single data source may be utilized to generate the response to the user request).

At block 435, the communications devices 100 is configured not to select both the selected functionality software component and the selected data source software component from the same software application, thereby not excluding either of the first software application 140A and the second software application 140B and thus allowing integration of the first software application 140A and the second software application 140B. That is, the selected functionality software component and the selected data source software component would not both be selected from the first software application 140A, such that the functionality software component 2A and the access to data source software component 3A are utilized to the exclusion of selecting any software components from the second software application 140B. Similarly, the selected functionality software component and the selected data source software component would not both be selected from the second software application 140B, such that the functionality software component 2B and the access to data source software component 3B are utilized to the exclusion of any components from the first software application 140A.

However, there may be case where the selected functionality software component is both the functionality software components 2A and 2B to be executed, and the selected data source software component is both the access to data source software component 3A and 3B.

The first software application 140A and the second software application 140B (and their respective components) are both designed to perform the same action (e.g., both can perform mapping and navigating) independent from one another, in which the same action independently results in the response (but only a single response is provided to the user). The user profile 135 comprises user preferences indicating what part of the first software application 140A (such as the user experience software component 1A, the functionality software component 2A, the access to data sources software component 3A) that the user prefers over the second software application (such as the user experience software component 1B, the functionality software component 2B, the access to data sources software component 3B) designed to perform the same action. Similarly, the user profile 135 comprises the user preferences indicating what part of the second software application 140B that the user prefers over the first software application 140A designed to perform the same action.

The user preferences in the user profile 135 indicate that the user prefers the first functionality software component 2A of the first software application 140A to perform the user request, such that the platform operating system selects the first functionality software component of the first software application 140A as the selected functionality software component. The user preference (of the user profile 135) indicates that the user prefers the second data source software component 3B associated with the second software application 140A to provide the data corresponding to the user request, such that the platform operating system 35 selects the second data source software component 3B of the second software application 140B as the selected data source.

In one case, the communications device 100 determines that the first functionality software component 2A and the second functionality software component 2B are both needed to perform the user request, and determines whether input and output (back and forth) between the first functionality software component 2A and the second software component 2B are in a compatible format. When the input and the output between the first functionality software component and the second software component are not in the compatible format, the communications device 100 translates the input and the output into the compatible format (as needed) such that the input and the output can flow (i.e., be passed back and forth) between the first functionality software component 2A and the second software component 2B. Also, translating the input and the output into compatible formats as needed allows data to be passed (in any direction) back and forth among the first functionality software component 2A, the second software component 2B, the first access to data sources 3A, and the second access to data sources 3B. When the input and the output are in the compatible format (at the onset), the communications device 100 passes/flows the input and the output (back and forth) between the first functionality software component and the second software component without requiring translating the input and the output.

The first software application and the second software application are competitors and are separately developed (e.g., by competing businesses/entities) to accomplish the user request. For example, the first software application and the second software application can be competitor in the same business market such as, Google® maps versus MapQuest®, Google® Play versus iTunes®, etc.

In one case, the first software application and the second software application have a compatible format designed according to a standardized format (although the first and second software applications are competitors), such that the communications device 100 can share/pass input and output between the first software application and the second software application as needed to fulfill the user request.

The communications device 100 determines that additional functionality is required to accomplish the user request, and automatically determines a new software application to provide the additional functionality by parsing a software application market 149 on the server 145. Assume that the new software application is the software application 140C. The new software application 140C comprises a new functionality software component 2C, a new user experience software component 1C, and a new data source software component 3C, all of which is parsed by the platform operating system in determining that the additional functionality can be met with new software application 140C. The communications device 100 automatically purchases and downloads the new software application 140C from the software application market 149, without requesting approval from the user according to the user profile 135.

As different options, the user request/task comprises may be related to a mapping and navigation request, a retrieving and playing audio request, a retrieving and playing movies request, a retrieving and playing video request, a controlling an appliance request, and a video telephone call request.

Given the teachings of the present disclosure, consider an example where the user request (received by the platform operating system 35) is for mapping and navigating to a destination location from a current location, and the user profile 135 prefers (as determined by the platform operating system 35) the user experience software component 1A and functionality software component 2A (both are part of the software application 140A). Additionally, with regard to the user request, the user profile 135 prefers (as determined by the platform operating system 35) the access to data sources software component 3B (of the software application 140B), because the access to data sources software component 3B requests and retrieves mapping and navigation data from (the more complete) data source 121B. Assume that the first software application 140A is Google® maps software application and that assume that the second software application 140B is MapQuest® software application, both of which are competitors using proprietary software. Google® maps software application 140A owns and retrieves mapping and navigating data from data sources 121A on server 120A, where access is restricted to only Google® maps. Likewise, MapQuest® maps software application 140B owns and retrieves mapping and navigating data from data sources 121B on server 120B, where access is restricted to only MapQuest® maps.

The user experience 1A and functionality software component 2A of the Google® maps software application 140A can process the user request (task) by receiving data from Google® data source 121A on server 120A but the Google® maps user experience software component 1A and functionality software component 2A (and Google® access to data sources 3A) cannot access the MapQuest® data sources 121B. After determining the restricted access to the data sources and in order to adhere to the user preferences in the user profile 135, the platform operating system 35 is configured to cause the user request to be executed by both Google® maps software application 140A and MapQuest® maps software application 140B. After the access to data sources software component 3B has retrieved the mapping and navigation data and passed the data to the functionality software component 2B and when the functionality software component 2B is passing the mapping and navigation data to the user experience 1B, the platform operating system 35 is configured to take the mapping and navigation data output from the MapQuest® maps functionality software component 2B and input this MapQuest® mapping and navigation data to the Google® maps functionality and user experience software components 1A and 2A. Using the MapQuest® mapping and navigation data retrieved from the MapQuest® data source 121B (in place of the Google® mapping navigation data retrieved from the Google® data source 121A), the Google® functionality and user experience software components 2A and 1A provide the response back to the user (as preferred in the user profile 135). The platform operating system 35 may have to modify the format of the MapQuest® mapping and navigating data feed coming from the MapQuest® software application 140B in order for the I/O data structure and syntax to be compatible with the input needed for Google® user experience 1A that is supported by the Google® functionality software component 2A. When the format of the MapQuest® mapping and navigating data is different from the usual format of the Google® mapping and navigating data, the platform operating system 35 may have to convert between waypoints data, latitude and longitude data, street address data, etc., in order to display desired navigation from the current location to the destination location as required by the user request. This allows the user of communications device to have the user experience and functionality of Google® maps, while utilizing the mapping and navigation data of MapQuest®, or vice versa according to the scenario. Note that the platform operating system 35 may parse the Google® software application 140A and the MapQuest® software application 140B in advance, such the platform operating system 35 can purchase and download any conversion software application (from the software application store 149) to ensure compatibility when mapping data is passed between the two Google® software application 140A and the MapQuest software application 140B. Note that various conversions for formatting occurs behind the scene without the user's knowledge (i.e., without the user's prompting). In one implementation, the platform operating system 35 may inform (display) the user that a conversion process may take a predetermined amount of time and ask the user whether he wants to proceed. If yes, the platform operating system 35 proceeds with the conversion according to the scenario. If no, the user selects not to proceed with the conversion, the platform operating system 35 can (solely) utilize the MapQuest® software application 140B from which the MapQuest® mapping and navigation data was retrieved. As well, if the user selects not to proceed with the conversion, the platform operating system 35 can (solely) utilize the Google® maps software application 140A from which Google® mapping and navigation data was retrieved.

By analogy, the above example scenario can also apply to two competitor music/movie providers, such as Google® play and iTunes®. Assume that software application 140A is for Google® play and the software application 140B is for iTunes® (or vice versa).

Note that the user profile 135 may include user preferences that the user explicitly selected, e.g., by right mouse clicking before and/or when a software application is running and then choosing prefer. Also, when there are two (or more) competitor software applications used by the user and the competitor software application can independently accomplish the user request/task, the platform operating system 35 is designed to ask questions, regarding the user experience, functionality, and data sources related to each software application 140, in order to generate user preferences in the user profile 135 according to embodiments. Whenever the platform operating system 35, determines the sequence of operations needed between software applications, the necessary conversions (for input and output), and the necessary conversion software applications, this information is stored in the mapping sequences 165 for subsequent use.

Although the platform operating system 35 may perform the integration and generate the mapping sequence 165 for determining which software component to perform first, second, third, etc., the software application store 149 (on server 145) may map what is necessary for integrated functionality, e.g., such as for a new functionality software component 2J, prior to download, integration, and use of the new functionality software component 2J on the communications device 100. This mapping of the mapping application stored in the software application store 149 (and received by the communication device 100) is performed in advance (and placed in the store 149) when the new functionality software component 2J is made available. This mapping may be performed by the individual, group, and/or company that created the new functionality software component 2J. This mapping could be a point of comparison with that of similar components. Also, the software application store 149 may provide (in advance) global mapping for the new functionality software component 2J, and the global mapping can be downloaded and integrated (by the communications device 100) to provide the mapping sequence 165 for the new functionality software component 2J. The global mapping for the new functionality software component 2J provides the necessary sequence of operations to integrate the new functionality software component 2J with all software applications in the software application 149 and/or all the software applications on the communications device 100. For example, the global mapping for the new functionality software component 2J provides the necessary conversions (for input and output) between the new functionality software component 2J and all of the software applications in the store 149, along with the necessary conversions (for input and output) between the new functionality software component 2J and the software applications on the communications device 100. The global mapping for the new functionality software component 2J may be stored in the mapping sequence 165. The global mapping for the new functionality software component 2J may be updated to add or remove some of the mapping.

Note that various examples have been discussed with regard to the processing performed by the communications device 100 but embodiments are not meant to be limited to processing by the communication devices 100. A server 198 may be in the cloud and the server 198 may store the same and/or nearly the same elements in memory 30, such that the server 198 can perform the integrated processes discussed herein. The server 198 can then send the result to the communications device 100 (e.g., such as a smart phone)

Figure 5:
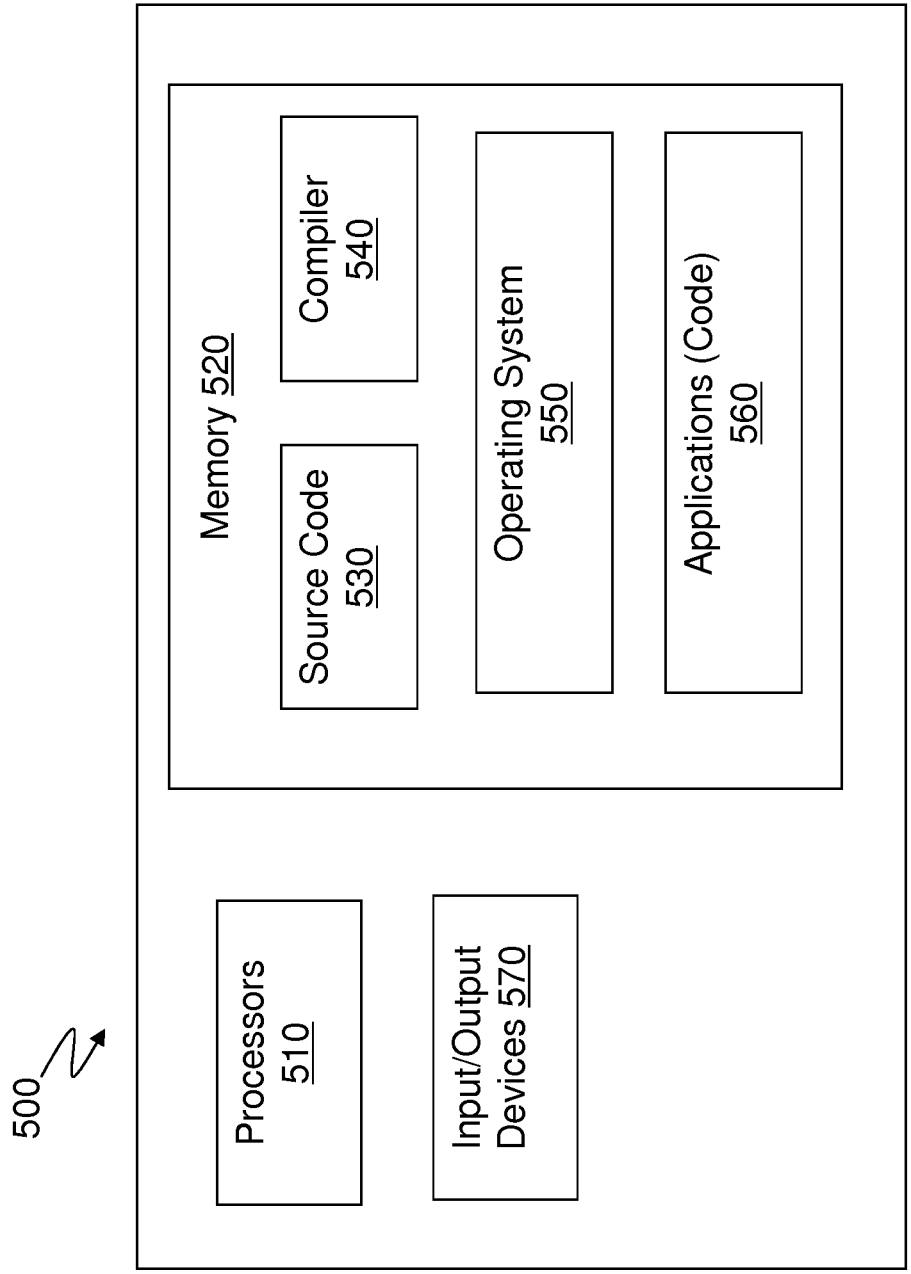
FIG. 5 illustrates an example of a computer having capabilities and features which may be included and/or incorporated in exemplary embodiments.

FIG. 5 illustrates an example of the computer 500 having capabilities, which may be included in exemplary embodiments. Various methods, procedures, circuits, elements, and techniques discussed herein may incorporate and/or utilize the capabilities of the computer 500. One or more of the capabilities of the computer 500 may be utilized to implement, to incorporate, to connect to, and/or to support any element discussed herein (as understood by one skilled in the art) in FIGS. 2-4. For example, the elements 100, 120, 130, 145, 160, 198 may incorporate any of the hardware and software features discussed in FIG. 5.

Generally, in terms of hardware architecture, the computer 500 may include one or more processors 510, computer readable storage memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a microprocessor.

The computer readable memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the computer readable memory 520 may include one or more separate programs, each of which comprises an ordered listing of executable instructions for implementing logical functions. The software in the memory 520 includes a suitable operating system (O/S) 550, compiler 540, source code 530, and one or more applications 560 of the exemplary embodiments. As illustrated, the application 560 comprises numerous functional components for implementing the features, processes, methods, functions, and operations of the exemplary embodiments. The application 560 of the computer 500 may represent numerous applications, agents, software components, modules, interfaces, controllers, etc., as discussed herein but the application 560 is not meant to be a limitation.

The operating system 550 may control the execution of other computer programs, and provides scheduling, input-output control, file and data management, memory management, and communication control and related services.

The application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions.

The I/O devices 570 may include input devices (or peripherals) such as, for example but not limited to, a mouse, keyboard, scanner, microphone, camera, etc. Furthermore, the I/O devices 570 may also include output devices (or peripherals), for example but not limited to, a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or an intranet. The I/O devices 570 may be connected to and/or communicate with the processor 510 utilizing Bluetooth connections and cables (via, e.g., Universal Serial Bus (USB) ports, serial ports, parallel ports, FireWire, HDMI (High-Definition Multimedia Interface), etc.).

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software, it should be noted that the application 560 can be stored on virtually any computer readable storage medium for use by or in connection with any computer related system or method. The application 560 can be embodied in any computer-readable medium for use by or in connection with an instruction execution system, apparatus, server, or device, such as a computer-based system, processor-containing system, or other system that can fetch the instructions from the instruction execution system, apparatus, or device and execute the instructions.

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As described above, the exemplary embodiments can be in the form of processor-implemented processes and devices for practicing those processes, such as processor. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A method for integrated functionality across separate software applications executed on a smartphone, the method comprising:
   receiving, by the smartphone, input of a user request from a user in order to provide a response;
   determining, by a platform operating system executed by a processor on the smartphone, a first software application and a second software application both of which are independently designed to perform actions for the user request in order to provide the response, the first software application and the second software application both being on the smartphone, the first and second software applications both being mobile applications configured for the smartphone;
   wherein the first software application and the second software application are both designed to perform a same action independent from one another, in which the same action independently results in the response requested b the user;
   wherein the platform operating system, residing on and executing on the smartphone, provides for integration of the first software application and the second software application;
   wherein the first software application, residing on and executing on the smartphone, comprises a first functionality software component to perform the user request and comprises a first data source software component to provide data corresponding to the user request;
   wherein the second software application, residing on and executing on the smartphone, comprises a second functionality software component to perform the user request and comprises a second data source software component to provide the data corresponding to the user request;
   according to a user profile, selecting, by the platform operating system executing on the smartphone, between the first functionality software component of the first software application designed to perform the same action independent from the second software application and the second functionality software component of the second software application designed to perform the same action independent from the first software application a selected functionality software component to perform the user request;
   according to the user profile, selecting, by the platform operating system executing on the smartphone, between the first data source software component of the first software application designed to perform the same action independent from the second software application and the second data source software component of the second software application designed to perform the same action independent from the first software application a selected data source software component from which to provide the data corresponding to the user request;
   presenting the response to the user request as the integration of the selected functionality software component and the selected data source software component;
   wherein the platform operating system, executing on the smartphone, does not select both the selected functionality software component and the selected data source software component from a same software application.

2. The method of claim 1,
   wherein the user profile comprises user preferences indicating what part of the first software application that the user prefers over the second software application designed to perform the same action;
   wherein the user profile comprises the user preferences indicating what part of the second software application that the user prefers over the first software application designed to perform the same action.

3. The method of claim 2, wherein the user preferences in the user profile indicate that the user prefers the first functionality software component of the first software application to perform the user request, such that the platform operating system selects the first functionality software component of the first software application as the selected functionality software component; and wherein the user preferences indicate that the user prefers the second data source software component associated with the second software application to provide the data corresponding to the user request, such that the platform operating system selects the second data source software component of the second software application as the selected data source software component.

4. The method of claim 2, further comprising determining that the first functionality software component and the second functionality software component are both needed to perform the user request;
   determining whether input and output between the first functionality software component and the second functionality software component are in a compatible format;
   when the input and the output between the first functionality software component and the second functionality software component are not in the compatible format, translating the input and the output into the compatible format such that the input and the output can pass between the first functionality software component and the second functionality software component;
   when the input and the output are in the compatible format, passing the input and the output between the first functionality software component and the second functionality software component without requiring translating the input and the output.

5. The method of claim 1, wherein the first software application and the second software application are competitors and are separately developed to accomplish the user request.

6. The method of claim 1, wherein the first software application and the second software application have a compatible format, such input and output can be shared between the first software application and the second software application.

7. The method of claim 1, further comprising determining that additional functionality is required to accomplish the user request;
   automatically determining, by the platform operating system, a new software application to provide the additional functionality by parsing a software application market;
   wherein the new software application comprises a new functionality software component, a new user experience software component, and a new data source software component, all of which is parsed by the platform operating system in determining that the additional functionality is met; and
   automatically purchasing and downloading, by the platform operating system, the new software application from the software application market, without requesting approval from the user according to the user profile.

8. The method of claim 1, wherein the user request comprises an option to be related to a mapping and navigation request, a retrieving and playing audio request, a retrieving and playing movies request, a retrieving and playing video request, a controlling an appliance request, and a video telephone call request.

9. An apparatus for integrated functionality across separate software applications, the apparatus comprising:
   a processor of a smartphone; and
   memory comprising computer-executable instructions that, when executed by the processor, cause the processor to perform operations, the operations comprising:
      receiving, by the smartphone, input of a user request from a user in order to provide a response;
      determining, by the processor of the smartphone, a first software application and a second software application both of which are independently designed to perform actions for the user request in order to provide the response, the first software application and the second software application both being on the smartphone, the first and second software applications both being mobile applications configured for the smartphone;
      wherein the first software application and the second software application are both designed to perform a same action independent from one another, in which the same action independently results in the response requested by the user;
      wherein integration of the first software application and the second software application is provided;
      wherein the first software application, residing on and executing on the smartphone, comprises a first functionality software component to perform the user request and comprises a first data source software component to provide data corresponding to the user request;
      wherein the second software application, residing on and executing on the smartphone, comprises a second functionality software component to perform the user request and comprises a second data source software component to provide the data corresponding to the user request;
      according to a user profile, selecting by the smartphone between the first functionality software component of the first software application designed to perform the same action independent from the second software application and the second functionality software component of the second software application designed to perform the same action independent from the first software application a selected functionality software component to perform the user request;
      according to the user profile, selecting by the smartphone between the first data source software component of the first software application designed to perform the same action independent from the second software application and the second data source software component of the second software application designed to perform the same action independent from the first software application a selected data source software component from which to provide the data corresponding to the user request;
      presenting the response to the user request as the integration of the selected functionality software component and the selected data source software component;
      wherein the processor, executing on the smartphone, does not select both the selected functionality software component and the selected data source software component from a same software application.

10. The apparatus of claim 9,
    wherein the user profile comprises user preferences indicating what part of the first software application that the user prefers over the second software application designed to perform the same action;
    wherein the user profile comprises the user preferences indicating what part of the second software application that the user prefers over the first software application designed to perform the same action.

11. The apparatus of claim 10, wherein the user preferences in the user profile indicate that the user prefers the first functionality software component of the first mapping software application to perform the user request, such that the processor selects the first functionality software component of the first mapping software application as the selected functionality software component; and wherein the user preferences indicate that the user prefers the second data source software component associated with the second mapping software application to provide the data corresponding to the user request, such that the processor selects the second data source software component of the second mapping software application as the selected data source software component.

12. The apparatus of claim 10, further comprising determining that the first functionality software component and the second functionality software component are both needed to perform the user request;

determining whether input and output between the first functionality software component and the second functionality software component are in a compatible format;

when the input and the output between the first functionality software component and the second functionality software component are not in the compatible format, translating the input and the output into the compatible format such that the input and the output can pass between the first functionality software component and the second functionality software component;

when the input and the output are in the compatible format, passing the input and the output between the first functionality software component and the second functionality software component without requiring translating the input and the output.

13. The apparatus of claim 9, wherein the first software application and the second software application are competitors and are separately developed to accomplish the user request.

14. The apparatus of claim 9, wherein the first software application and the second software application have a compatible format, such input and output can be shared between the first software application and the second software application.

15. The apparatus of claim 9, further comprising determining that additional functionality is required to accomplish the user request;

automatically determining a new software application to provide the additional functionality by parsing a software application market;

wherein the new software application comprises a new functionality software component, a new user experience software component, and a new data source software component, all of which is parsed by the processor in determining that the additional functionality is met; and automatically purchasing and downloading the new software application from the software application market, without requesting approval from the user according to the user profile.

16. The apparatus of claim 9, wherein the user request comprises an option to be related to a mapping and navigation request, a retrieving and playing audio request, a retrieving and playing movies request, a retrieving and playing video request, a controlling an appliance request, and a video telephone call request.

17. A computer program product, tangibly embodied on a non-transitory computer readable medium, for integrated functionality across separate software applications, the computer program product including instructions that, when executed by a processor on a smartphone, cause the processor to perform operations comprising:

receiving, by the smartphone, input of a user request from a user in order to provide a response;

determining, by the processor on the smartphone, a first software application and a second software application both of which are independently designed to perform actions for the user request in order to provide the response, the first software application and the second software application both being on the smartphone, the first and second software applications both being mobile applications configured for the smartphone;

wherein the first software application and the second software application are both designed to perform a same action independent from one another, in which the same action independently results in the response requested by the user;

wherein integration of the first software application and the second software application is provided;

wherein the first software application, residing on and executing on the smartphone, comprises a first functionality software component to perform the user request and comprises a first data source software component to provide data corresponding to the user request;

wherein the second software application, residing on and executing on the smartphone, comprises a second functionality software component to perform the user request and comprises a second data source software component to provide the data corresponding to the user request;

according to a user profile, selecting by the smartphone, between the first functionality software component of the first software application designed to perform the same action independent from the second software application and the second functionality software component of the second software application designed to perform the same action independent from the first software application a selected functionality software component to perform the user request;

according to the user profile, selecting by the smartphone, between the first data source software component of the first software application designed to perform the same action independent from the second software application and the second data source software component of the second software application designed to perform the same action independent from the first software application a selected data source software component from which to provide the data corresponding to the user request;

presenting the response to the user request as the integration of the selected functionality software component and the selected data source software component;

wherein the processor, executing on the smartphone, does not select both the selected functionality software component and the selected data source software component from a same software application.

18. The computer program product of claim 17, wherein the user profile comprises user preferences indicating what part of the first software application that the user prefers over the second software application designed to perform the same action;

wherein the user profile comprises the user preferences indicating what part of the second software application that the user prefers over the first software application designed to perform the same action.

19. The computer program product of claim 18, wherein the user preferences in the user profile indicate that the user prefers the first functionality software component of the first software application to perform the user request, such that the processor selects the first functionality software component of the first software application as the selected functionality software component; and
  wherein the user preferences indicate that the user prefers the second data source software component associated with the second software application to provide the data corresponding to the user request, such that the processor selects the second data source software component of the second software application as the selected data source software component.

20. The computer program product of claim 18, further comprising determining that the first functionality software component and the second functionality software component are both needed to perform the user request;
  determining whether input and output between the first functionality software component and the second functionality software component are in a compatible format;
  when the input and the output between the first functionality software component and the second functionality software component are not in the compatible format, translating the input and the output into the compatible format such that the input and the output can pass between the first functionality software component and the second functionality software component;
  when the input and the output are in the compatible format, passing the input and the output between the first functionality software component and the second functionality software component without requiring translating the input and the output.

* * * * *